Nov. 21, 1967  D. J. TOMAN  3,354,460

REDUNDANT RUNWAY LOCALIZER LANDING SYSTEM

Filed Jan. 16, 1967  2 Sheets-Sheet 1

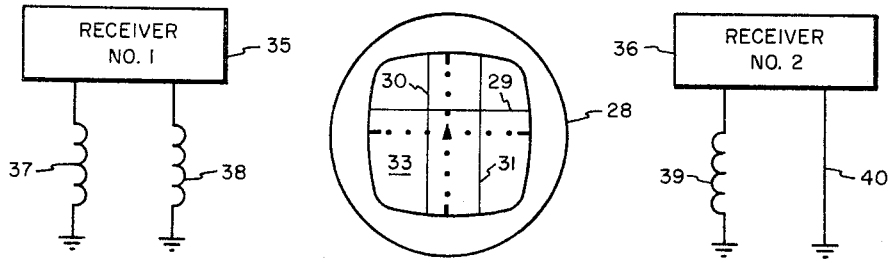
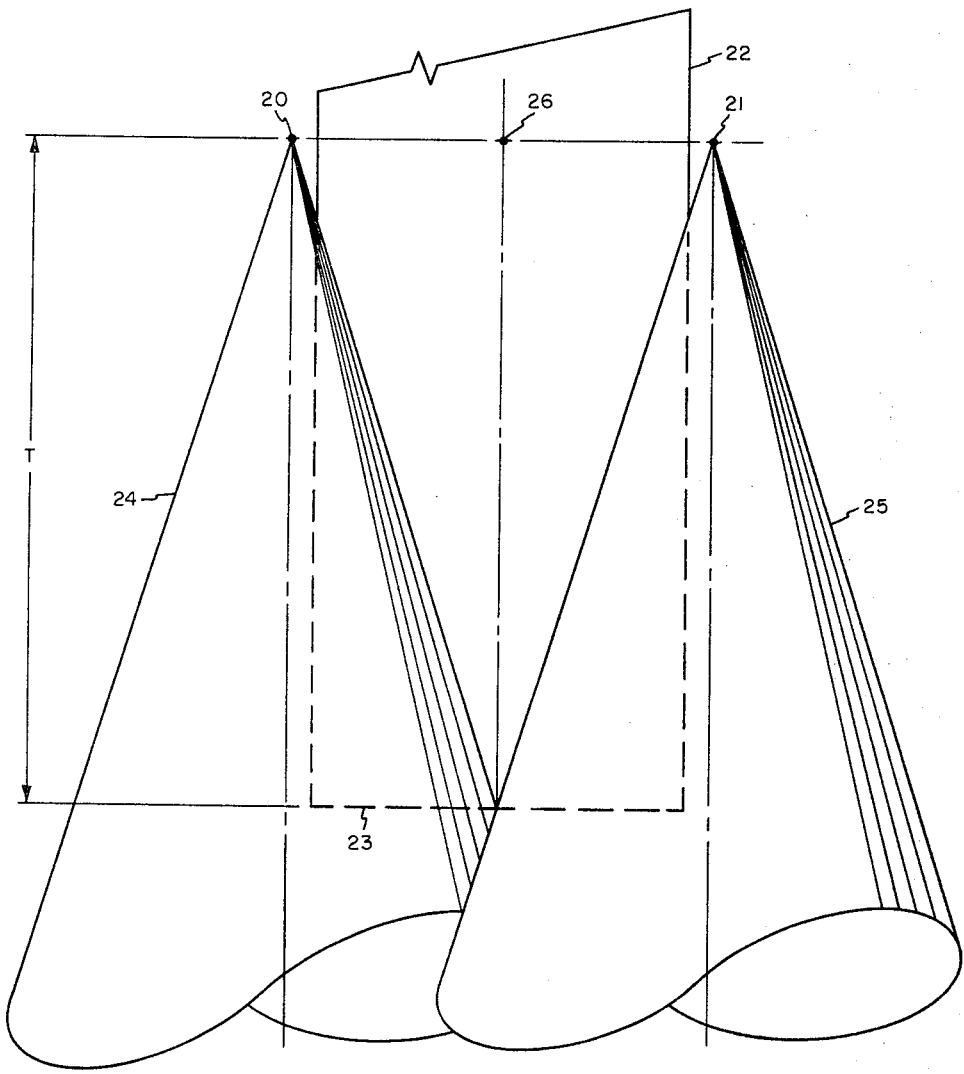

United States Patent Office 3,354,460
Patented Nov. 21, 1967

3,354,460
REDUNDANT RUNWAY LOCALIZER
LANDING SYSTEM
Donald J. Toman, Pleasantville, N.Y., assignor to General Precision, Inc., a corporation of Delaware
Filed Jan. 16, 1967, Ser. No. 609,632
9 Claims. (Cl. 343—108)

ABSTRACT OF THE DISCLOSURE

Method and apparatus for simulating the approaching runway and the relative position of the aircraft to same in a blind-approach instrument landing system. A transmitter for radiating electromagnetic energy is located on either side of the runway to establish separate parallel localizer references extending toward the approaching aircraft. Receiving equipment mounted aboard the latter detects the separate localizers, derives positional error voltages from each, and applies these separately to an indicator having two independently displaceable parallel related localizer bales.

Brief summary of the invention

Navigational landing aids are known which provide means for enabling pilots to safely guide their aircraft to a runway or landing strip under conditions of poor visibility and ceiling. One such blind-approach landing system, described in Patent 3,197,777 and assigned to the assignee of this invention, comprises a compact low power microwave transmitter threshold mounted on the runway centerline. The transmitter is bore sighted at an angle equal to the desired glide-slope and is adapted to generate a rotating conically scanned beam in alignment therewith. At the same time, means are provided at the transmitter for frequency modulating the beam subcarrier frequency with a signal having a frequency phased with reference to a fixed point in the beam's rotation cycle.

Aboard the approaching aircraft, a compact lightweight receiver detects the transmitted energy and amplitude demodulates the subcarrier to recover the modulation signal produced by space modulation of the rotating beam. Inasmuch as the amplitude of the demodulated AM signal as well as its phase provide all the information necessary to determine the aircraft's position in the beam cross-section relative to the scanning axis, the latter serves as a common source for both the runway localizer and the glideslope path. The beam subcarrier is also frequency demodulated to recover the FM signal introduced at the transmitter and therefore the phase of this signal may be employed as a convenient angular reference. Thus, when the phases of the demodulated AM and FM signals are compared in a synchronous detector a first signal is secured representing the horizontal component of aircraft position error relative to the scan axis. The demodulated FM signal is then phase-shifted 90° and again compared with the phase of the demodulated AM signal in a second synchronous detector to derive a second signal representing the vertical component of aircraft position error. These first and second signals are then respectively applied to a conventional cross-pointer indicator for feeding back positional error indications to the pilot. To close the loop and fly the aircraft down the axis of the scanning beam, the pilot merely steers the aircraft in the manner required to keep the deflection of the cross-pointers at zero.

As mentioned above, the localizer and the glide-slope are combined into the axis of a single rotating beam and this dictates locating the transmitter on the runway centerline at the latter's threshold. Aside from the obvious drawback of having the transmitter located in the direct path of the approaching aircraft, this configuration has serious disadvantages in other respects, namely, the presentation of an increasingly narrowing beam to the receiving apparatus aboard the descending aircraft. This, in turn, has the undesirable effect of proportionately increasing the gain and/or the scale factor of the system. That is, the closer the aircraft gets to the transmitter, the less and less lateral departure is required relative to the glide-slope localizer (i.e., the beam scanning axis) for a full scale deflection of the cross-pointers. As a result, many pilots tend to overcorrect near the runway producing a dangerous condition of "hunting" and instability.

To overcome this problem, the present invention contemplates the provision of dual transmitters, each one being of the type disclosed in the aforementioned patent and each one being situated on opposite sides of the runway near the latter's approach end. A receiver capable of detecting the two transmitted beams is mounted aboard the aircraft and feeds a novel indicator similar to a conventional cross-opinter indicator, but having two localizer bales instead of one. The localizer bales are adapted to diverge as aircraft distance from the transmitters decreases thereby giving to the pilot a more realistic perspective rendering of an approaching runway. In addition, the mean position of the two bales represents the center of the runway; therefore as the plane laterally diverts with respect to the runway centerline the two bales will both move in concert either right or left accordingly. Since the pilot is now presented at all times with a simulated picture of his aircraft's positional relationship relative to the runway centerline, his tendency to overcorrect and consequently to "hunt" across the localizer is sharply reduced.

Brief description of the drawings

FIG. 2 is a geometrical rendering of the instrument landing system according to the present invention.

FIG. 3 is a schematic of the novel indicator according to the invention.

Detailed description of the invention

Figure 1:
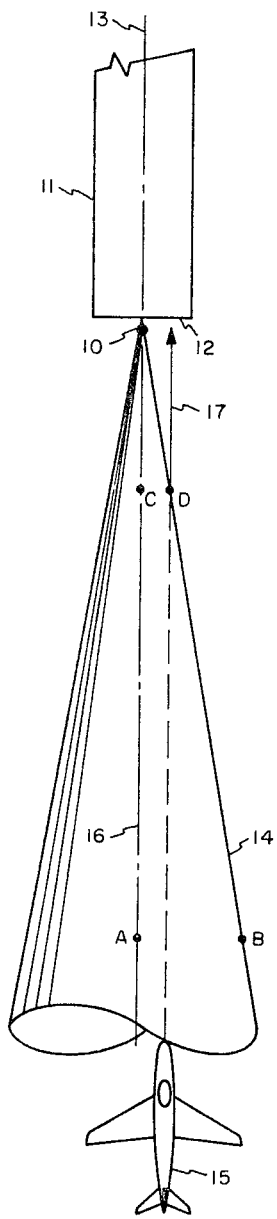
FIG. 1 is a geometrical rendering of the prior art instrument landing system.

Initially, reference is made to FIG. 1 wherein the geometrical configuration of the prior art instrument landing system is shown. A transmitter represented generally at 10 is situated on runway 11 at the intersection of the latter's threshold 12 and centerline 13. The transmitter radiates therefrom a rotating conically scanned beam 14 of electromagnetic energy toward the region of expected aircraft approach. Since the localizer and the glide-slope path are both defined by the beam's scanning axis 16, the receiver mounted aboard the descending aircraft 15 will detect the transmitted energy and derive therefrom signals proportional to the positional error of the aircraft relative to said axis. Now, for the purpose of illustration, consider a special case wherein the aircraft flies a constant error course relative to the localizer plane represented, for instance, by vector 17. To simplify matters even more, let it further be assumed that there is no error deviation with respect to the glide-slope path. At a relatively remote point in the approach zone the aircraft's permissible deviation from the localizer for a full scale deflection of the localizer needle on the cross-pointer indicator is quite large, as indicated, for example, by the distance between points A and B, FIG. 1. Thus, as the aircraft passes through the A–B plane in the beam's cross-section its position error therein will be reflected by approximately a one-quarter scale deflection of the localizer needle to the left. The aircraft then continues to fly down the glide-slope along path 17. However, because the conical field of radiation converges toward its source, the scale factor of the cross-pointer indicator unfortunately increases in direct proportion; this in spite of the fact that the aircraft is maintaining a constant position error deviation relative to the localizer plane. Eventually, therefore, the aircraft will reach a cross-sectional plane in the beam, identified in exemplary fashion by the distance between points C–D in FIG. 1, where the cross-pointer indicator will deflect full scale although the aircraft will still be short of the transmitter and/or runway. Clearly, at this juncture, the usefulness of the system will abruptly terminate. The latter in itself, however, cannot be considered entirely fatal because it has been found that the cross-section C–D usually occurs in the beam at a point sufficiently close enough to the transmitter for the pilot to acquire visual access of the runway under all but zero visibility and ceiling conditions. Of deeper concern is the psychological effect the increasing scale factor of the cross-pointer indicator has on the pilot. The increasingly larger needle deflections occurring nearer the transmitter tend to encourage the pilot to overreact, producing a dangerous "hunting" of his aircraft back and forth across the localizer plane. To avoid this, the present invention contemplates the improved instrument landing system represented schematically in FIG. 2.

As indicated in the latter, two transmitters 20, 21 are oppositely disposed on either side of runway 22 at a distance T from the runway threshold 23. Although many variables including transmitter beam width, runway geometry, and distance to threshold for full scale deflection, ordinarily must be considered before arriving at a suitable value for T, it has been found, by way of example, that one thousand feet from the runway threshold will in most cases be acceptable. Since each transmitter is preferably of the type fully disclosed in Patent 3,197,777 it is deemed unnecessary to describe their structural details herein. Suffice it to say, at this point, that the transmitters are angularly bore-sighted parallel to each other and to a suitable preselected glide-slope path, respectively; the latter originating on the runway centerline at a distance T down from the threshold as indicated generally by reference character 26. Accordingly, the transmitters respectively radiate parallel rotating conically scanned beams of electromagnetic energy 24, 25 toward the region of expected aircraft approach as generally shown. Since the scanning axes of the two beams are in substantial alignment with the runway side-edges respectively, redundant parallel horizontal localizer reference planes are formed in space separated by a distance approximately equal to the width of the runway.

Mounted aboard the approaching aircraft, two conventional receivers of the type fully disclosed in the aforementioned Patent 3,197,777 feed a novel indicator according to the invention. This state of affairs is schematically diagrammed in FIG. 3. As shown therein, the indicator 28 comprises a conventional cross-pointer having the usual glide-slope bale 29 and localizer bale 30, but modified slightly to include a second localizer bale 31. A transparent face plate 33 covers the instrument and displays scale markings and a small centrally positioned black wedge to simulate the aircraft's position relative to the indicator bales. Receiver 35 is adapted to detect the transmitted energy in beam 24 and derive signals therefrom for deflecting the glide-slope bale 29 and the localizer bale 30 through their respective actuating coils 37, 38. Likewise, receiver 36 detects the energy transmitted within beam 25 and derives a signal therefrom for deflecting the localizer bale 31 through its actuating coil 39. The glide-slope deviation signal also derived by receiver 36 is not needed and is therefore grounded as indicated generally by reference character 40.

In order to insure that each receiver detects only the energy in its associated transmitted beam, the subcarrier frequency in one transmitter is made to differ from the corresponding subcarrier frequency in the other transmitter. Thus, by way of illustration, transmitter 20 preferably utilizes a subcarrier having a frequency equal to 10 kHz, whereas transmitter 21 preferably employs a subcarrier frequency equal to 13kHz. In turn, the detector and amplifier stages in the front end of each receiver are tuned to match only their corresponding subcarrier frequencies. By this arrangement, suitable means are provided for enabling each receiver to distinguish between the two transmitted beams.

Figure 4A:
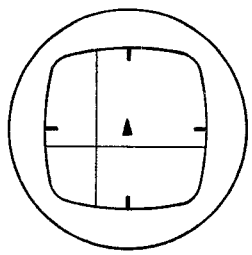
FIGS. 4A–D are sketches of the aforementioned indicator under various display conditions.

In the operation of the instrument landing system according to the present invention, the aircraft enters the approach zone defined by the transmitted beams at a relatively remote point from the runway, say, ten nautical miles for example. At this distance the scale factor of indicator 28 is not yet large enough to reflect the lateral displacement between the different localizer planes produced by the two transmitters indicated generally in FIG. 2; hence, for all intents and purposes, the two transmitted parallel beams appear as one. Consequently, as the pilot steers his aircraft toward the intersection of the localizers and the glide-slope plane, the indicator 28 begins to take on the appearance as shown by way of example in FIG. 4A. It will be appreciated, therefore, that when the approaching aircraft initially locks onto the localizer and glide-slope and begins its descent, the system according to the invention functions in a manner identical to that of prior art instrument landing systems. The pilot thus steers the aircraft in the manner necessary to keep the intersection of the localizer bales and the glide-slope bale centered on the black wedge of the indicator face. Gradually, as the aircraft closes on the runway, the transmitted beams converge toward their source, respectively, and the scale factor of the indicator increases accordingly. As a result, the localizer bales 29, 31 begin to diverge or spread relative to each other thus giving the illusion to the pilot of an approaching runway as seen on the indicator.

Figure 4B:
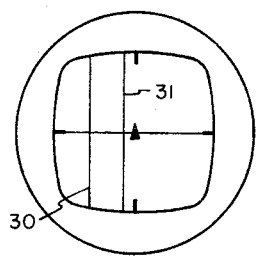
Figure 4C:
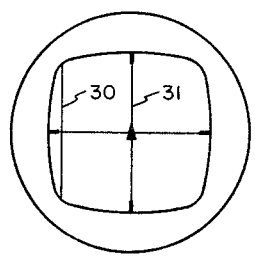
Figure 4D:
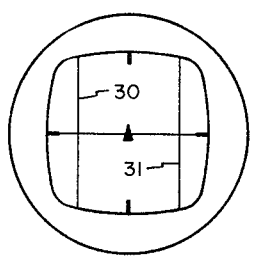

Now let it be assumed at this point that a gust of wind, for instance, causes the aircraft to laterally depart off course to the right of the runway. As respects the scanning axis of the two transmitted beams, the aircraft is now to the right of both, but it is farther to the right of beam 24 than it is to beam 25. Therefore, localizer bale 30 deflects to the left a greater extent then localizer bale 31 deflects in the same direction. In consequence, the resulting indicator display, shown in FIG. 4B, graphically illustrates to the pilot in a most realistic manner his aircraft's new position to the right of the runway. As a dividend, the relative displacement between the localizer bales per se gives the pilot a rough approximation of the distance yet to fly to the runway. Monitoring the indicator the pilot then guides his aircraft left toward the runway centerline. A moment later, the indicator display appears as depicted in FIG. 4C telling the pilot that he is now vectoring in alignment with the right edge of the runway. The increased displacement between the localizer bales due to the constantly increasing indicator scale factor also informs him that he is getting closer to the runway. The pilot then continues to steer left until the small black wedge on indicator face plate 33 is centered between the two localizer bales as shown in FIG. 4D, indicating that the aircraft is now on the correct course, namely, in alignment with the runway centerline. All of the while, the two localizer bales continue to diverge simulating the approaching runway until finally full scale deflection occurs indicating to the pilot that the aircraft is crossing the runway threshold.

From the geometry of FIG. 2, it is apparent that the point of full scale deflection can be made to vary by merely changing the angular spread of each conically scanned transmitted beam. Therefore, the instant invention should not be construed to be limited to the occurrence of full scale deflection of indicator 28 at the runway threshold as this was done only for the purpose of illustration.

Furthermore, it is anticipated that many other modifications may be made without departing from the principles of the present invention. For example, instead of relying exclusively upon a conventional cross-pointer indicator, modified by the addition of a second localizer bale and the latter's actuating movement to indicate the aircraft's position relative to the two transmitted localizer references, an electroluminescent display panel may be used instead to present the same information to the pilot. In this case, an analog to digital converter plus a decoding matrix would be necessary to couple the localizer DC signals from each receiver to the panel. Likewise, it is not essential that the microwave transmitting and receiving equipment disclosed in Patent 3,197,777 be used to carry out the invention. In fact, it should be clear now that a wide variety of prior art ILS equipments may be used in practicing the method disclosed herein, particularly those employing radio frequency energy to transmit the localizer reference in conjunction with suitable apparatus for detecting the RF localizer and for deriving a positional error voltage relative thereto. Obviously, additional departures may be made without departing from the spirit of the invention as expressed in the accompanying claims and therefore the invention should not be limited to the exact specifications shown and described as only the preferred matters have been given by way of illustration.

What is claimed is:

1. The method of navigating an approaching aircraft toward a runway under conditions of poor visibility and ceiling comprising the steps of, transmitting separate parallel localizer references from the region of said runway toward the region of said approaching aircraft, detecting said separate parallel related localizers and deriving from each an electrical signal, the magnitude and polarity of each said signal representing the lateral deviation and direction respectively of said aircraft relative to said localizer references respectively, and displaying to the pilot of said aircraft visual parallel displacements relative to a fixed reference point representing the instantaneous position of said aircraft, each of said displacements being proportional to a corresponding one of said signals.

2. The method of claim 1, comprising the additional step of, placing the transmitting source of each separate localizer on opposite sides of said runway adjacent thereto.

3. The method of claim 1, comprising the additional steps of, transmitting a glide-slope reference orthogonally related to said parallel localizer references, detecting said glide-slope reference and deriving therefrom a signal corresponding thereto, said signal having a magnitude and polarity corresponding respectively to the lateral deviation and direction of said aircraft relative to said glide-slope reference, and displaying to said pilot a visual displacement orthogonally related to said parallel displacements, said orthogonally related displacement occurring relative to said fixed reference point and being proportional to said last mentioned signal.

4. The method of claim 3, comprising the additional step of transmitting said glide-slope reference coincidentally with either one of said parallel localizer references.

5. The method of instrument landing an airborne vehicle comprising the steps of, locating at least one transmitter adjacent each side edge of a landing strip, each of said transmitters being adapted to radiate a conically shaped beam of electromagnetic energy, the axes of said conically shaped beams extending up and away from said landing strip and being parallel to each other as well as in longitudinal alignment with each of said side edges respectively, providing means aboard said airborne vehicle for detecting the presence of said radiated electromagnetic energy and deriving analog signals therefrom representing the lateral departure of said airborne vehicle relative to each of said axes, applying said analog signals to an indicator in said airborne vehicle, said indicator comprising a transparent faceplate having indicia centrally positioned thereon to represent the instantaneous position of said vehicle and a pair of independently displaceable elongated elements movably mounted behind said faceplate for simulating the two side-edges of said landing strip, each of said elements being constrained to move in substantially constant parallel relation relative to each other in response to a corresponding one of said analog signals.

6. An instrument landing system comprising, a runway having two longitudinally extending side edges, at least two transmitters, each one of said transmitters being located in substantially juxtaposed relation to each one of said side edges, respectively, said transmitters being adapted to radiate conically shaped beams of electromagnetic energy, the axis of each beam being longitudinally aligned with a corresponding one of said runway side edges and being parallel to each other, said axes further being angularly elevated in alignment with the direction of expected aircraft descent to said runway, an aircraft, means mounted aboard said aircraft for detecting said beams and distinguishing therebetween, means responsive to said first mentioned means for generating plural signals indicative of the aircraft's lateral positional deviation relative to each beam's axis, and display means mounted aboard said aircraft, said display means being responsive to said plural signals for indicating the aircraft's positional deviation relative to each side edge of said runway.

7. The instrument landing system of claim 6, in which, said plural signals comprise signals proportional to the orthogonal components of said lateral positional deviation relative to each of said beam axes respectively.

8. The instrument landing system of claim 7, in which, said display means comprises an indicator having, a transparent faceplate, indicia means centrally fixed on said face plate for simulating the position of the aircraft, a pair of independently displaceable parallel disposed bales for simulating the side edges of said runway respectively, said bales being mounted behind said faceplate and being constrained to move relative to each other in a direction normal to their parallel dispositions, and a third bale orthogonally displaceable relative to said previously mentioned pair of bales, said third bale being mounted behind said faceplate.

9. An indicator for use in a blind approach instrument landing system comprising, support means, a transparent cover plate overlying said support means and having indicia centrally fixed thereon, said indicia simulating the position of an aircraft approaching a runway, first displaceable indicator means mounted behind said faceplate and on said support means for simulating one of the longitudinal side edges of said runway, second displaceable indicator means mounted behind said faceplate and on said support means for simulating the other longitudinal side edge of said runway, and means for constraining the movement of said first and second displaceable indicator means whereby said indicator means are always parallel to each other.

References Cited

UNITED STATES PATENTS

| | | | |
|---|---|---|---|
| 2,255,659 | 9/1941 | Gage | 343—112 |
| 2,677,820 | 5/1954 | Bouzitat et al. | 343—112 |
| 3,128,464 | 4/1964 | Kaufman et al. | 343—107 |

RODNEY D. BENNETT, *Primary Examiner.*

H. C. WAMSLEY, *Assistant Examiner.*